US008423749B2

(12) United States Patent
Mejdrich et al.

(10) Patent No.: US 8,423,749 B2
(45) Date of Patent: Apr. 16, 2013

(54) SEQUENTIAL PROCESSING IN NETWORK ON CHIP NODES BY THREADS GENERATING MESSAGE CONTAINING PAYLOAD AND POINTER FOR NANOKERNEL TO ACCESS ALGORITHM TO BE EXECUTED ON PAYLOAD IN ANOTHER NODE

(75) Inventors: Eric O. Mejdrich, Rochester, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 12/255,827

(22) Filed: Oct. 22, 2008

(65) Prior Publication Data

US 2010/0100707 A1 Apr. 22, 2010

(51) Int. Cl.
*G06F 9/40* (2006.01)
(52) U.S. Cl.
USPC ............................................. 712/30; 718/104
(58) Field of Classification Search .................. None
See application file for complete search history.

(56) References Cited

U.S. PATENT DOCUMENTS

| 7,486,673 | B2 | 2/2009 | Harijono et al. |
| 7,716,330 | B2 | 5/2010 | Kulig et al. |
| 8,020,163 | B2 * | 9/2011 | Nollet et al. ................... 718/104 |
| 8,151,245 | B2 * | 4/2012 | Oberlin et al. ................. 717/121 |
| 8,214,845 | B2 * | 7/2012 | Hoover et al. ................. 718/108 |
| 2006/0136570 | A1 | 6/2006 | Pandya |
| 2008/0140991 | A1 | 6/2008 | Pandya |
| 2008/0186974 | A1 | 8/2008 | Singh et al. |
| 2009/0063825 | A1 | 3/2009 | McMillen et al. |
| 2009/0282222 | A1 | 11/2009 | Hoover et al. |

FOREIGN PATENT DOCUMENTS

| EP | 1966713 A2 | 9/2008 |
| WO | 2004072797 A2 | 8/2004 |
| WO | 2007079095 A2 | 7/2007 |
| WO | 2008097710 A2 | 8/2008 |

OTHER PUBLICATIONS

Sailesh Kumar et al., "Algorithms to accelerate multiple regular expressions matching for deep packet inspection", Sep. 2006.
U.S. Appl. No. 13/036,779, "Regular Expression Searches Utilizing General Purpose Processors on a Network Interconnect" by Jamie R. Kuesel et al., filed Feb. 28, 2011.
U.S. Appl. No. 13/036,779—Non-Final Office Action Mailed Jan. 2, 2013.

* cited by examiner

*Primary Examiner* — Kenneth Kim
(74) *Attorney, Agent, or Firm* — Jim Boice

(57) ABSTRACT

A computer-implemented method, system and computer program product for controlling an algorithm that is performed on a unit of work in a subsequent software pipeline stage in a Network On a Chip (NOC) is presented. In one embodiment, the method executes a first operation in a first node of the NOC. The first node generates payload, and then loads that payload into a message. The message with the payload is transmitted to a nanokernel that controls a second node in the NOC. The nanokernel calls an algorithm that is needed by a second operation in a second node in the NOC, which uses the algorithm to execute the second operation.

17 Claims, 9 Drawing Sheets

SEQUENTIAL PROCESSING IN NETWORK ON CHIP NODES BY THREADS GENERATING MESSAGE CONTAINING PAYLOAD AND POINTER FOR NANOKERNEL TO ACCESS ALGORITHM TO BE EXECUTED ON PAYLOAD IN ANOTHER NODE

TECHNICAL FIELD

The present disclosure relates to the field of computers, and specifically to threaded computers. Still more particularly, the present disclosure relates to Network On a Chip (NOC) integrated circuits.

DESCRIPTION OF THE RELATED ART

A Network On A Chip (NOC) is a novel integrated circuit that applies a network architecture to a single chip to create a unique processing unit. Rather than utilizing a standard single von Neumann architecture, which has a control unit that coordinates data flowing between an arithmetic logic unit and memory, and between the arithmetic logic unit and input/output buffers along system and Input/Output (I/O) busses, a NOC passes data between logic nodes (each of which may utilize a von Neumann-type processor) using packets. Each packet includes a header, which addresses the logic node that is to receive and process the packet.

When a packet (e.g., a work packet granule) is dispatched to a NOC, control of that packet is lost. That is, after the packet is dispatched to the NOC from a host computer, the host computer then must simply wait until the output from the packet is returned to the host computer. Thus, the packet is a "fire and forget" unit, which is autonomously controlled and processed by the NOC.

Sometimes, a packet has an algorithm that needs to follow that particular packet. For example, consider an exemplary NOC that is used to generate images on a monitor that simulate a real object, such as a piece of fruit. An initial piece of logic within the NOC may create the general shape (e.g., a sphere that is generated by a primitive piece of code—"primitive"). Subsequently, another piece of software (e.g., a shader) may be used to color and shade (e.g., shine, tint, shade, etc.) the sphere. Currently, there is no practical method or logic for dynamically invoking such a shader onto the primitive within the environment of a NOC.

SUMMARY OF THE INVENTION

A computer-implemented method, system and computer program product for controlling an algorithm that is performed on a unit of work in a subsequent software pipeline stage in a Network On a Chip (NOC) is presented. In one embodiment, the method executes a first operation in a first node of the NOC. The first node generates payload, and then loads that payload into a message. The message with the payload is transmitted to a nanokernel that controls a second node in the NOC. The nanokernel calls an algorithm that is needed by a second operation in a second node in the NOC, which uses the algorithm to execute the second operation. Thus, the nanokernel dynamically invokes that algorithm such that the algorithm stays logically associated with the first operation.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
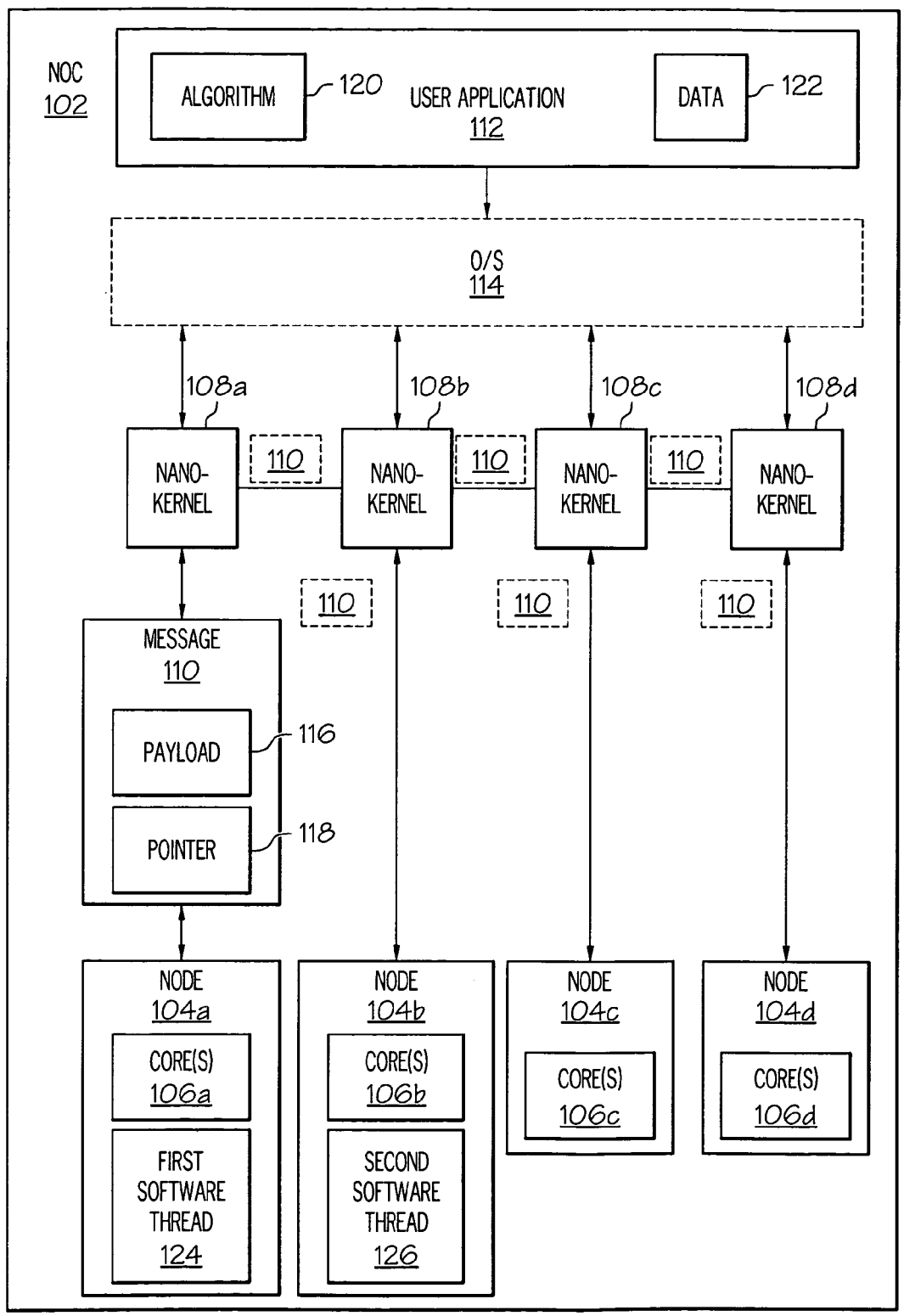
FIG. 1 depicts a high-level depiction of an exemplary Network On a Chip (NOC) as contemplated for use by the present invention.
Figure 2:
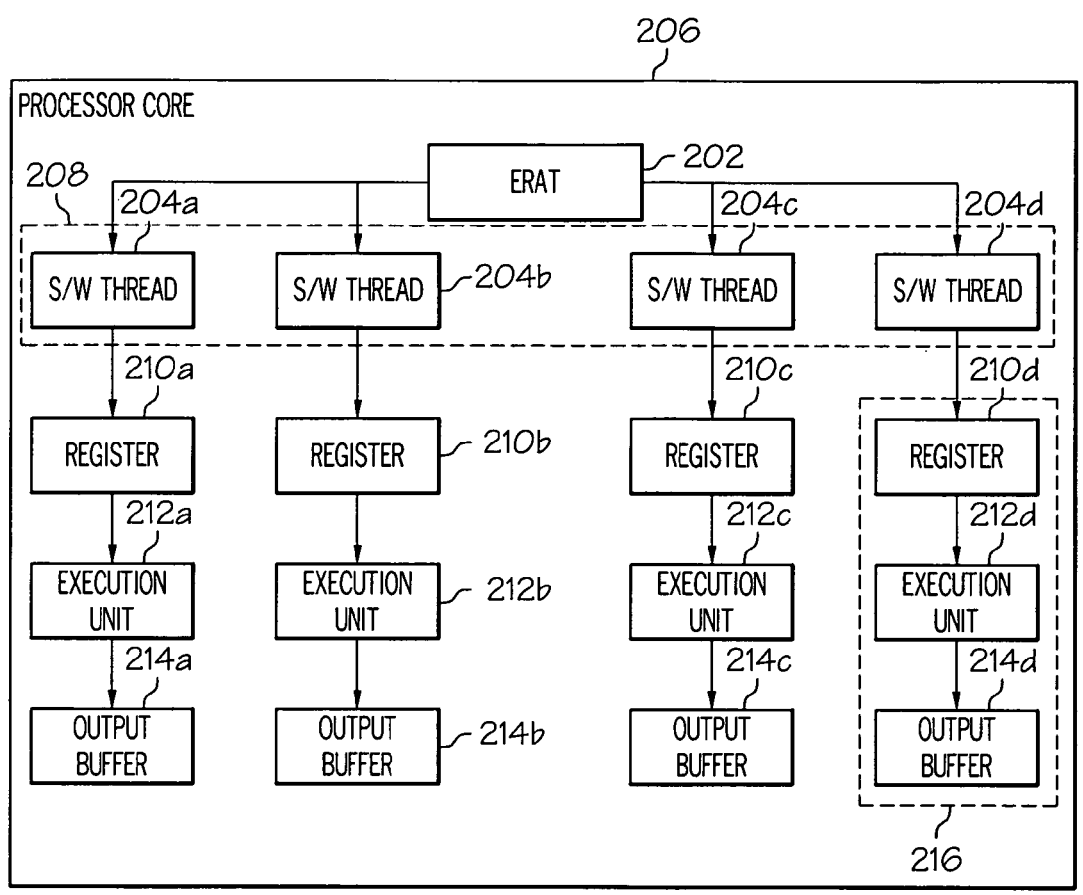
FIG. 2 illustrates additional detail of a core within a node on the NOC shown in FIG. 1.

With reference now to the figures, and particularly to FIG. 1, an exemplary Network On a Chip (NOC) 102 is presented. NOC 102 comprises multiple nodes 104*a-d* (where "d" is an integer). Additional details for NOC 102 are presented below in FIGS. 2-6. Each of the multiple nodes 104*a-d* comprises at least one processor core (depicted as core(s) 106*a-d*). Each of the nodes 104*a-d* is associated with a nanokernel. Thus, each of the nodes 104*a-d* may utilize a different dedicated nanokernel (e.g., the depicted nanokernels 108*a-d*), or all of the nodes 104*a-d* may share a single nanokernel (not shown). A nanokernel is defined as software logic that manages software threads within a NOC by coordinating actions performed by nodes within the NOC. This coordination may be performed by invoking (e.g., pointing to) relevant algorithms and/or data for a particular software thread and/or user application, as well as coordinating compilation of an algorithm at run time. Thus, in an exemplary embodiment, a nanokernel is a thin piece of software logic that, by reading a message generated by a first software thread from user application 112, is able to call an algorithm that is used by second software thread from the user application 112. Each software thread may be processed by a different node from nodes 104*a-d*, or software threads may be processed by different hardware threads within a single node selected from nodes 104*a-d*. Note that, in one embodiment, user application 112 can communicate with nodes 104*a-d* using a thin Operating System (O/S) 114, which includes a kernel that connects the user application 112 to the nanokernels 108*a-d*. In a preferred embodiment of the present invention, however, O/S 114 is bypassed (omitted), and the user application 112 directly communicates with nanokernels 108*a-d*.

Figure 6:
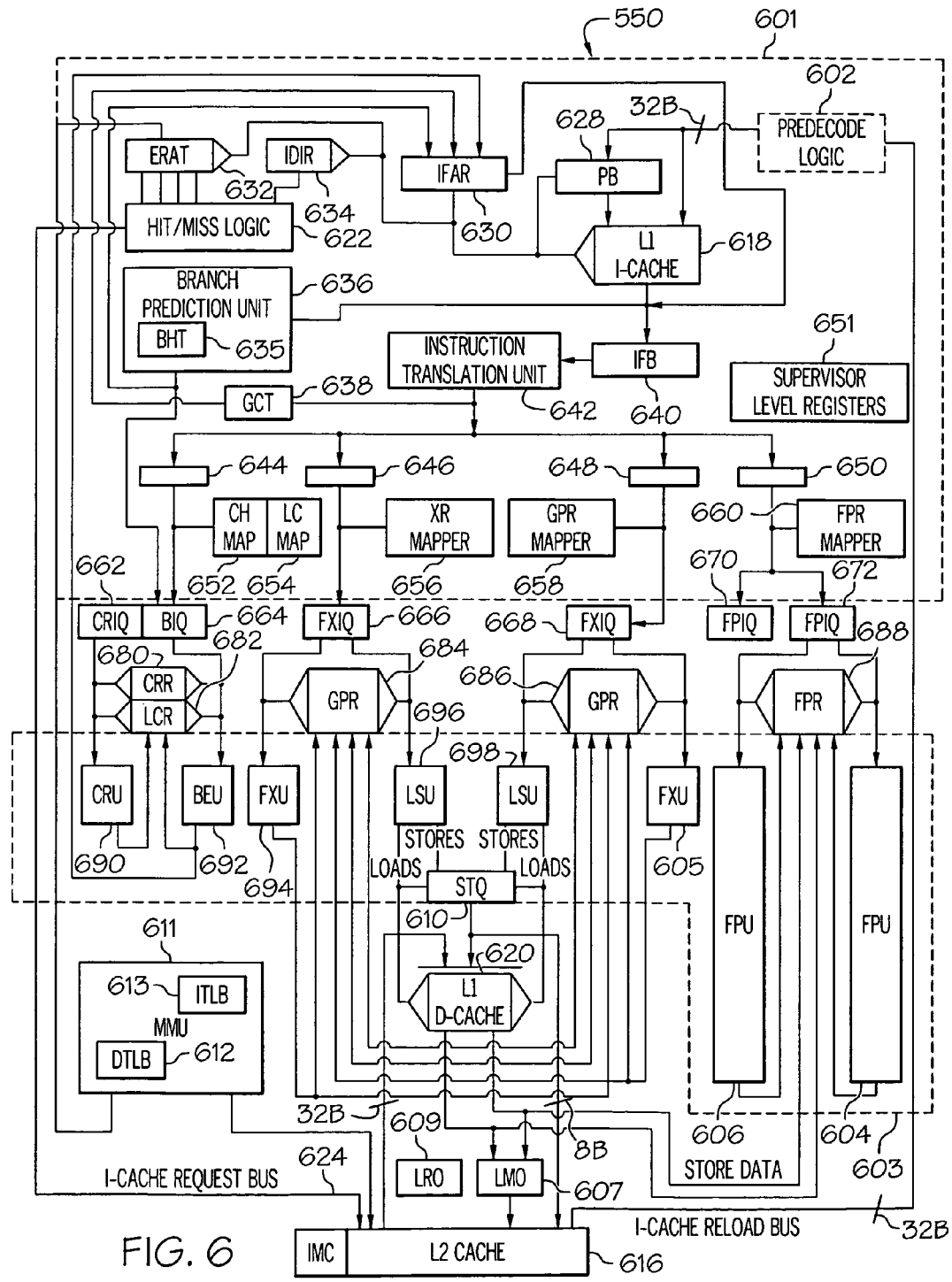
FIG. 6 illustrates additional detail of a processor core found at an IP block node of the NOC shown in FIG. 5.

As noted above, each node (e.g., one of nodes 104a-d) includes one or more processor cores (e.g., one of processor core(s) 106a-d). Additional detail of an exemplary embodiment of such processor cores is presented as a processor core 206 in FIG. 2. Within processor core 206 is an Effective-to-Real Address Table (ERAT) 202, which is used to dispatch different software threads 204a-d from a work unit 208, which may be a user application (e.g., user application 112 shown in FIG. 1) or messages from nodes within the NOC, as described herein. When the work unit 208 is received by the processor core 206 (that is within the addressed node in the NOC), a specific hardware thread 216, made up of a register 210d, an execution unit 212d, and an output buffer 214d, will execute the instructions in the software thread 204d. With reference to FIG. 6 below, an exemplary hardware thread may be composed of FPR mapper 660, FPIQ 672, FPR 688 and FPU 604. Another exemplary hardware thread may be composed of GPR mapper 658, FXIQ 668, FXU 605, and GPR 686. These are exemplary hardware threads, as others may be contemplated that include FXU 694, LSU 698, CRU 690, BEU 692, etc.

Referring again to FIG. 2, note that in one embodiment, only hardware thread 216 may be allowed to execute execution of software thread 204d, while the other hardware threads (respectively composed of the other registers 210a-c, execution units 212a-c, and output buffers 214a-c) are frozen until software thread 204d completes execution.

Returning now back to FIG. 1, assume, for exemplary purposes, that a user application 112 is an application for creating a realistic depiction of an orange on a monitor (e.g., display device 346 shown below in FIG. 3). Assume also that node 104a has executed a first software thread 124 to create a wireframe (i.e., a digital image of a skeletal sphere) of an orange. This wireframe is digitized as payload 116, which is the output of first software thread 124. An application programmer has previously specified an algorithm 120 and data 122 to provide shading and other texturing to the wireframe in order to create the realistic depiction of the orange. Algorithm 120 can be pre-compiled and stored within the NOC 102 or within a controller (e.g., a processor 304 shown below in FIG. 3) that is coupled to NOC 102. Alternatively, algorithm 120 can be compiled when called at run time (e.g., by a second software thread 126 that is described below). However, for purposes of simplicity and clarity in describing the present example, assume that algorithm 120 has been precompiled.

In order to provide needed shading/texturing/etc. to the orange's wireframe, a second software thread 126 needs to be executed, either within the same node 104a or, as depicted, a different node 104b. In order to properly execute, second software thread 126 needs to utilize algorithm 120 (which is software for providing additional realistic detail to the orange's wireframe) and/or data 122 (which is used by algorithm 120). In order to access algorithm 120 and/or data 122, second software thread 126 uses pointer 118 in message 110 to point to the location of algorithm 120 and/or data 122 within a storage location (e.g., cache, system memory, a hard drive, etc.) that is associated with NOC 102. Alternatively, algorithm 120 and/or data 122 are part of the payload 116 found in message 110, thus making message 110 larger (and needing more bandwidth to transmit) but more readily accessible to the second software thread 126.

Besides pointing to the algorithm 120 and/or data 122 needed, pointer 118 can point to a pipeline stage that the second software thread 126, algorithm 120 and/or data 122 should be executed within. That is, pointer 118 can point to a particular node (e.g., node 104b), core (e.g., one of multiple cores 106b), and/or hardware thread (e.g., hardware thread 216 shown in FIG. 2) in which the second software thread 126 should be invoked in.

Once the second software thread 126 has executed, a new message (not depicted) with a new payload and pointer can be sent to another node or pipeline stage within NOC 102. Such messages continue to be generated in a sequential, cascading manner until the user application 112 completes execution.

Again, note that in one embodiment of the NOC 102 depicted in FIG. 1, each of the nodes 104a-d has exclusive rights to a dedicated respective nanokernel 108a-d. In another embodiment, however, a single nanokernel (not shown) is used to control messages between all of the nodes 104a-d. However, the preferred embodiment uses a different nanokernel with each node in order to provide a more robust architecture, in which each nanokernel can manage messages in a unique prescribed manner.

Note also that data 122 can include hint bits that provide information to the second software thread 126 on how to optimize execution of algorithm 120. For example, continue to assume that algorithm 120 has been pre-compiled. A hint bit (not shown) in data 122 can lock down the most recently used code (that resulted from the algorithm being compiled) in an Instruction Cache (e.g., an L1 I-Cache 618 depicted below in FIG. 6), and pointer 118 can then be pointed to this cache.

Figure 3:
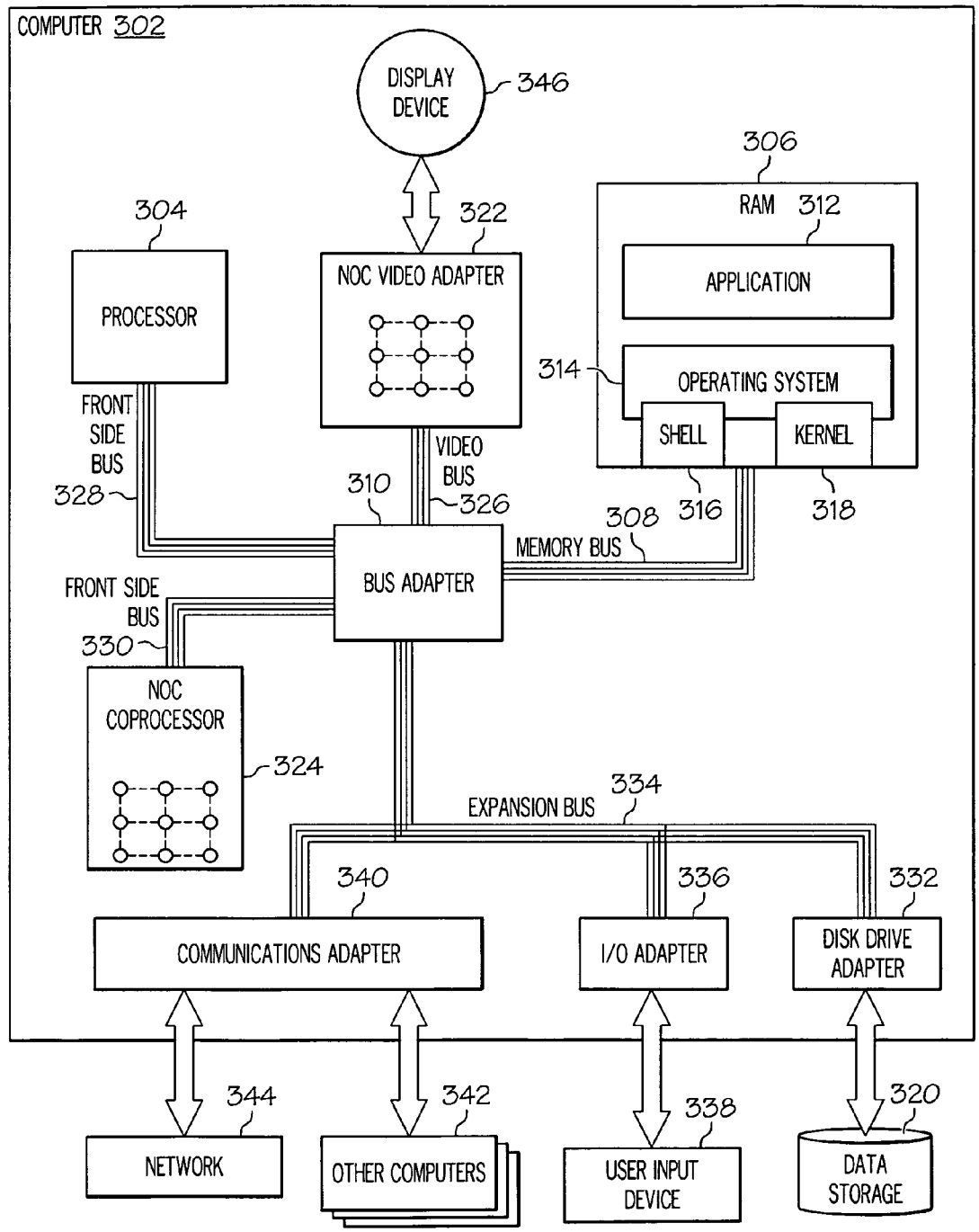
FIG. 3 depicts an exemplary embodiment of a computer that utilizes one or more NOCs.

An exemplary apparatus that utilizes a NOC in accordance with the present invention is described at a high level in FIG. 3. As depicted, FIG. 3 sets forth a block diagram of an exemplary computer 302, which is useful in data processing with a NOC according to embodiments of the present invention. Computer 302 includes at least one computer processor 304. Computer 302 also includes a Random Access Memory (RAM) 306, which is system memory that is coupled through a high speed memory bus 308 and bus adapter 310 to processor 304 and to other components of the computer 302.

Stored in RAM 306 is an application program 312, a module of computer program instructions for carrying out particular data processing tasks such as, for example, word processing, spreadsheets, database operations, video gaming, stock market simulations, atomic quantum process simulations, or other user-level applications. Application program 312 also includes control processes, such as those described above in FIGS. 1-2 and below in FIGS. 7-9. Also stored in RAM 306 is an Operating System (OS) 314. OS 314 includes a shell 316, for providing transparent user access to resources such as application programs 312. Generally, shell 316 is a program that provides an interpreter and an interface between the user and the operating system. More specifically, shell 316 executes commands that are entered into a command line user interface or from a file. Thus, shell 316, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 318) for processing. Note that while shell 316 is a text-based, line-oriented user interface, the present invention will equally well support other user interface modes, such as graphical, voice, gestural, etc.

As depicted, OS 306 also includes kernel 318, which includes lower levels of functionality for OS 306, including providing essential services required by other parts of OS 306 and application programs (e.g., application 312), including memory management, process and task management, disk management, and mouse and keyboard management.

Although operating system 306 and the application 312 in the example of FIG. 3 are shown in RAM 306, such software components may also be stored in non-volatile memory, such as on a disk drive as data storage 320.

The example computer 302 includes two example NOCs according to embodiments of the present invention: a NOC video adapter 322 and a NOC coprocessor 324. The NOC video adapter 322 is an example of an I/O adapter specially designed for graphic output to a display device 346 such as a display screen or computer monitor. NOC video adapter 322 is connected to processor 304 through a high speed video bus 326, bus adapter 310, and the front side bus 328, which is also a high speed bus.

The example NOC coprocessor 324 is connected to processor 304 through bus adapter 310, and front side bus 328 and front side bus 330, which is also a high speed bus. The NOC coprocessor 324 is optimized to accelerate particular data processing tasks at the behest of the main processor 304.

The example NOC video adapter 322 and NOC coprocessor 324 each include a NOC according to embodiments of the present invention, including Integrated Processor ("IP") blocks, routers, memory communications controllers, and network interface controllers, with each IP block being adapted to a router through a memory communications controller and a network interface controller, each memory communications controller controlling communication between an IP block and memory, and each network interface controller controlling inter-IP block communications through routers. The NOC video adapter 322 and the NOC coprocessor 324 are optimized for programs that use parallel processing and also require fast random access to shared memory. In one embodiment, however, the NOCs described herein and contemplated for use by the present invention utilize only packet data, rather than direct access to shared memory. Again, note that additional details of exemplary NOC architecture as contemplated for use by the present invention are presented below in FIGS. 4-6.

Continuing with FIG. 3, computer 302 may include a disk drive adapter 332 coupled through an expansion bus 334 and bus adapter 310 to processor 304 and other components of computer 302. Disk drive adapter 332 connects non-volatile data storage to the computer 302 in the form of the disk drive represented as data storage 320. Disk drive adapters useful in computers for data processing with a NOC according to embodiments of the present invention include Integrated Drive Electronics ("IDE") adapters, Small Computer System Interface ("SCSI") adapters, and others as will occur to those of skill in the art. Non-volatile computer memory also may be implemented such as an optical disk drive, Electrically Erasable Programmable Read-Only Memory (so-called "EEPROM" or "Flash" memory), and so on, as will occur to those of skill in the art.

The example computer 302 also includes one or more input/output ("I/O") adapters 336. I/O adapter(s) 336 implement user-oriented input/output through, for example, software drivers and computer hardware for controlling output to display devices such as computer display screens, as well as user input from user input devices 338, such as keyboards and mice.

The exemplary computer 302 may also include a communications adapter 340 for data communications with other computers 342, and for data communications with a data communications network 344. Such data communications may be carried out serially through RS-232 connections, through external buses such as a Universal Serial Bus ("USB"), through data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and IEEE 802.x adapters for wireless data communications network communications.

Note that while NOC video adapter 322 and NOC coprocessor 324 are but two exemplary uses of a NOC, the NOCs and control of work packets described herein may be found in any context in which a NOC is useful for data processing.

Figure 4:
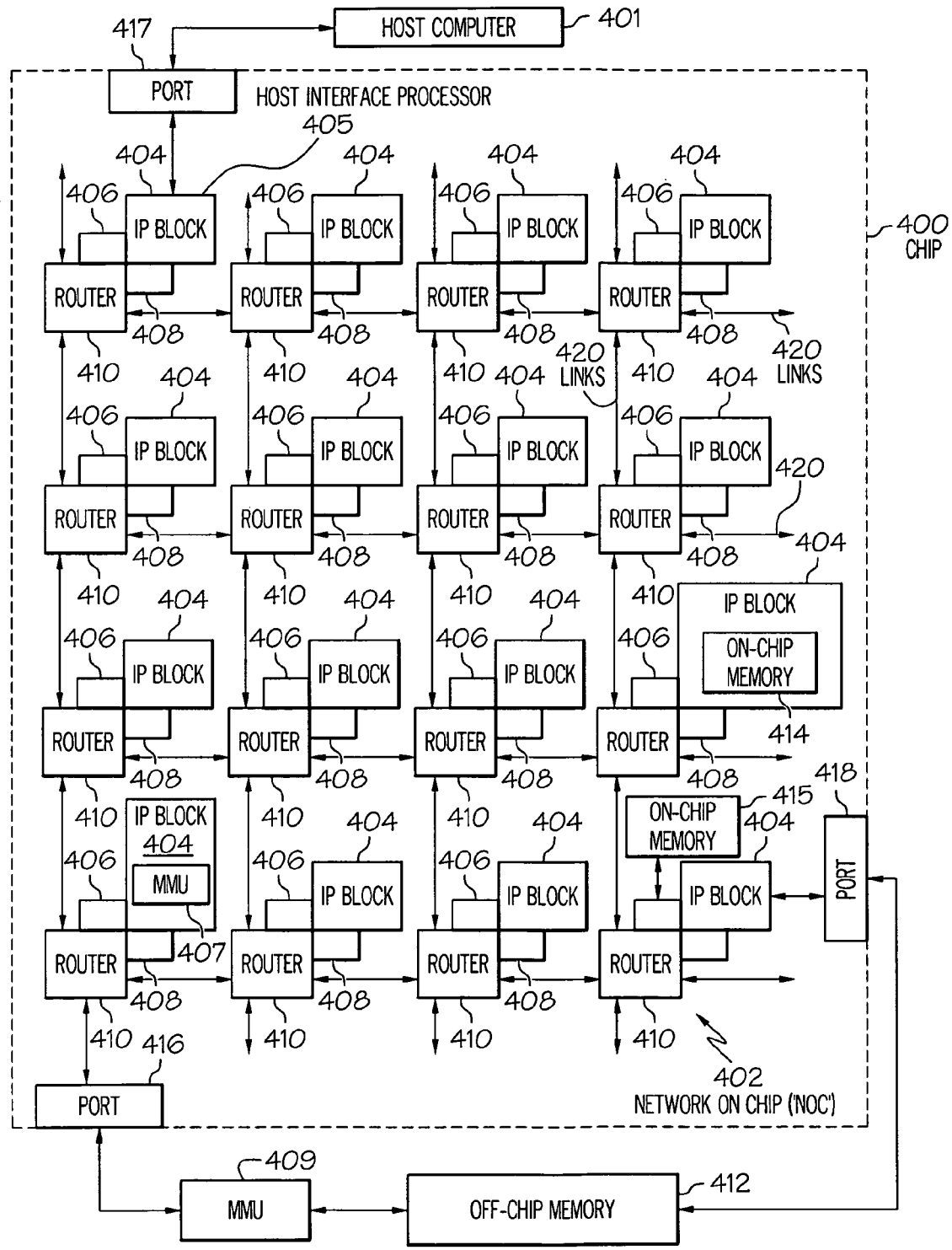
FIG. 4 illustrates additional detail of the one or more NOCs depicted in FIG. 3.

With reference now to FIG. 4, a functional block diagram is presented of an exemplary NOC 402 according to embodiments of the present invention. NOC 402 is an exemplary NOC that may be utilized as NOC video adapter 322 and/or NOC coprocessor 324 shown in FIG. 3. NOC 402 is implemented on an integrated circuit chip 400, and is controlled by a host computer 401 (e.g., processor 304 shown in FIG. 3). The NOC 400 includes Integrated Processor ("IP") blocks 404, routers 410, memory communications controllers 406, and network interface controllers 408. Each IP block 404 is adapted to a router 410 through a dedicated memory communications controller 406 and a dedicated network interface controller 408. Each memory communications controller 406 controls communications between an IP block 404 and memory (e.g., an on-chip memory 414 and/or an off-chip memory 412), and each network interface controller 408 controls inter-IP block communications through routers 410.

In NOC 402, each IP block 404 represents a reusable unit of synchronous or asynchronous logic design used as a building block for data processing within the NOC 402. The term "IP block" is sometimes referred to as an "intellectual property block," thus designating an IP block 404 as a design that is owned by a party, which is the intellectual property of a party, to be licensed to other users or designers of semiconductor circuits. In the scope of the present invention, however, there is no requirement that IP blocks be subject to any particular ownership, so the term is always expanded in this specification as "integrated processor block." Thus, IP blocks 404, as specified here, are reusable units of logic, cell, or chip layout design that may or may not be the subject of intellectual property. Furthermore, IP blocks 404 are logic cores that can be formed as Application Specific Integrated Circuit (ASIC) chip designs or Field Programmable Gate Array (FPGA) logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHSIC Hardware Description Language (VHDL). In addition to netlist and synthesizable implementation, NOCs may also be delivered in lower-level, physical descriptions. Analog IP block elements such as a Serializer/Deserializer (SERDES), Phase-Locked Loop (PLL), Digital-to-Analog Converter (DAC), Analog-to-Digital Converter (ADC), and so on, may be distributed in a transistor-layout format such as Graphic Data System II (GDSII). Digital elements of IP blocks are sometimes offered in layout format as well.

Each IP block 404 shown in FIG. 4 is adapted to a router 410 through a memory communications controller 406. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 406 are described in more detail below in FIG. 5.

Each IP block 404 depicted in FIG. 4 is also adapted to a router 410 through a network interface controller 408. Each network interface controller 408 controls communications through routers 410 between IP blocks 404. Examples of communications between IP blocks include messages (e.g., message/data packets) carrying data and instructions for processing the data among IP blocks in parallel applications and in pipelined applications. The network interface controllers 408 are described in more detail below in FIG. 5.

The routers 410 and links 420 among the routers implement the network operations of the NOC 402 shown in FIG. 4. The links 420 are packet structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, thus requiring 512 wires. In addition, each link 420 is bi-directional, so that if the link packet structure includes 64 bytes, the wire bus actually contains 1024 wires between each router 410 and each of its neighbor routers 410 in the network. A message can include more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

As stated above, each memory communications controller 406 controls communications between an IP block and memory. Memory can include off-chip main RAM 412, an on-chip memory 415 that is connected directly to an IP block through a memory communications controller 406, on-chip memory enabled as an IP block 414, and on-chip caches. In the NOC 402 shown in FIG. 4, either of the on-chip memories (414, 415), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. On-chip memory 414 on an IP block can be addressed from that IP block or from any other IP block in the NOC. On-chip memory 415 is attached directly to a memory communication controller, and can be addressed by the IP block that is adapted to the network by that memory communication controller. Note that on-chip memory 415 can also be addressed from any other IP block 404 anywhere in the NOC 402.

Exemplary NOC 402 includes two Memory Management Units ("MMUs") 407 and 409, illustrating two alternative memory architectures for NOCs according to embodiments of the present invention. MMU 407 is implemented with a specific IP block 404, allowing a processor within that IP block 404 to operate in virtual memory while allowing the entire remaining architecture of the NOC 402 to operate in a physical memory address space. The MMU 409 is implemented off-chip, connected to the NOC through a data communications port referenced as port 416. Port 416 includes the pins and other interconnections required to conduct signals between the NOC 402 and the MMU 409, as well as sufficient intelligence to convert message packets from the NOC packet format to the bus format required by the external MMU 409. The external location of the MMU 409 means that all processors in all IP blocks 404 of the NOC 402 can operate in virtual memory address space, with all conversions to physical addresses of the off-chip memory handled by the off-chip MMU 409.

In addition to the two memory architectures illustrated by use of the MMUs 407 and 409, the data communications port depicted as port 418 illustrates a third memory architecture useful in NOCs according to embodiments of the present invention. Port 418 provides a direct connection between an IP block 404 of the NOC 402 and off-chip memory 412. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 418. The port 418 includes the pins and other interconnections required to conduct signals between the NOC and the off-chip memory 412, as well as sufficient intelligence to convert message packets from the NOC packet format to the bus format required by the off-chip memory 412.

In the exemplary NOC 402 shown in FIG. 4, one of the IP blocks 404 is designated a host interface processor 405. A host interface processor 405 provides an interface between the NOC 402 and a host computer 401 (introduced in FIG. 2). Host interface processor 405 provides data processing services to the other IP blocks on the NOC, including, for example, receiving and dispatching among the IP blocks of the NOC data processing requests from the host computer.

Host interface processor 405 is connected to the larger host computer 401 through a data communications port such as port 417. Port 417 includes the pins and other interconnections required to conduct signals between the NOC 402 and the host computer 401, as well as sufficient intelligence to convert message packets from the NOC 402 to the bus format required by the host computer 401. In the example of the NOC coprocessor 324 in the computer 302 shown in FIG. 3, such a port would provide data communications format translation between the link structure of the NOC coprocessor 324 and the protocol required for the front side bus 330 between the NOC coprocessor 324 and the bus adapter 310.

Figure 5:
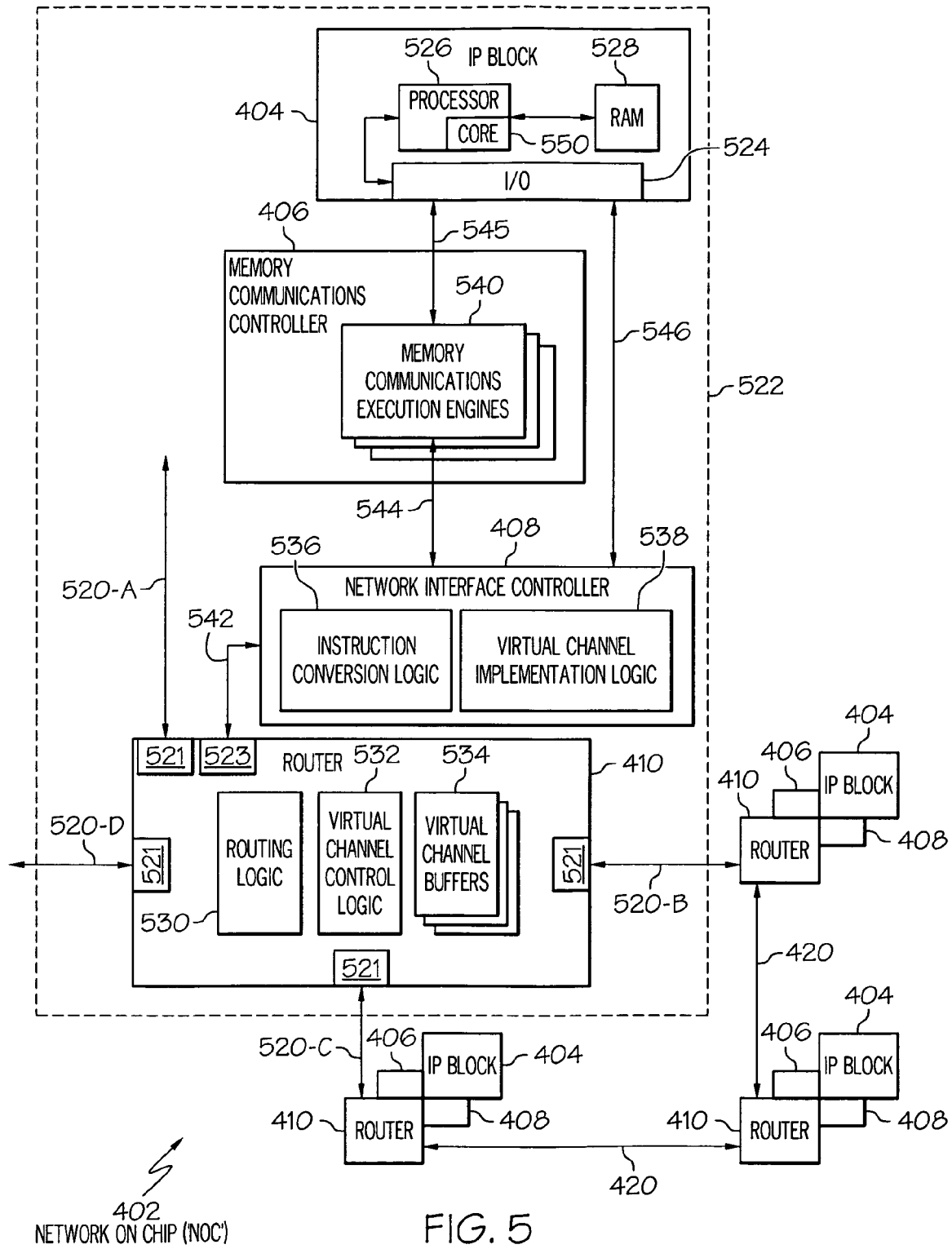
FIG. 5 depicts additional detail of an IP block node of the NOC shown in FIG. 4.

Referring now to FIG. 5, additional detail of NOC 402 is presented according to embodiments of the present invention. As depicted in FIG. 4 and FIG. 5, NOC 402 is implemented on a chip (e.g., chip 400 shown in FIG. 4), and includes integrated processor ("IP") blocks 404, routers 410, memory communications controllers 406, and network interface controllers 408. Each IP block 404 is adapted to a router 410 through a memory communications controller 406 and a network interface controller 408. Each memory communications controller 406 controls communications between an IP block and memory, and each network interface controller 408 controls inter-IP block communications through routers 410. In the example of FIG. 5, one set 522 of an IP block 404 adapted to a router 410 through a memory communications controller 406 and network interface controller 408 is expanded to aid a more detailed explanation of their structure and operations. All the IP blocks, memory communications controllers, network interface controllers, and routers in the example of FIG. 5 are configured in the same manner as the expanded set 522.

In the example of FIG. 5, each IP block 404 includes a computer processor 526, which includes one or more cores 550, and I/O functionality 524. In this example, computer memory is represented by a segment of Random Access Memory ("RAM") 528 in each IP block 404. The memory, as described above with reference to the example of FIG. 4, can occupy segments of a physical address space whose contents on each IP block are addressable and accessible from any IP block in the NOC. The processors 526, I/O capabilities 524, and memory (RAM 528) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC 402 shown in FIG. 5, each memory communications controller 406 includes a plurality of memory communications execution engines 540. Each memory communications execution engine 540 is enabled to execute memory communications instructions from an IP block 504, including bidirectional memory communications instruction flow (544, 545, 546) between the network interface controller 408 and the IP block 404. The memory communications instructions executed by the memory communications controller may originate, not only from the IP block adapted to a router through a particular memory communications controller, but also from any IP block 404 anywhere in the NOC 402. That is, any IP block 404 in the NOC 402 can generate a memory communications instruction and transmit that memory communications instruction through the routers 410 of the NOC 402 to another memory communications controller associated with another IP block for execution of that memory communications instruction. Such memory communications instructions can include, for example, translation lookaside buffer control instructions, cache control instructions, barrier instructions, and memory load and store instructions.

Each of the depicted memory communications execution engines 540 is enabled to execute a complete memory communications instruction separately and in parallel with other memory communications execution engines 540. The memory communications execution engines 540 implement a scalable memory transaction processor optimized for concurrent throughput of memory communications instructions. The memory communications controller 406 supports multiple memory communications execution engines 540, all of which run concurrently for simultaneous execution of multiple memory communications instructions. A new memory communications instruction is allocated by the memory communications controller 406 to each memory communications execution engine 540, and the memory communications execution engines 540 can accept multiple response events simultaneously. In this example, all of the memory communications execution engines 540 are identical. Scaling the number of memory communications instructions that can be handled simultaneously by a memory communications controller 406, therefore, is implemented by scaling the number of memory communications execution engines 540.

In the NOC 402 depicted in FIG. 5, each network interface controller 408 is enabled to convert communications instructions from command format to network packet format for transmission among the IP blocks 404 through routers 410. The communications instructions are formulated in command format by the IP block 410 or by the memory communications controller 406 and provided to the network interface controller 408 in command format. The command format is a native format that conforms to architectural register files of the IP block 404 and the memory communications controller 406. The network packet format is the format required for transmission through routers 410 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC 402 shown in FIG. 5, each IP block 404 is enabled to send memory-address-based communications to and from memory through the IP block's memory communications controller and then also through its network interface controller to the network. A memory-address-based communications is a memory access instruction, such as a load instruction or a store instruction, which is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (using instruction conversion logic 536) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 406 is naturally also the network location of that memory communication controller's associated router 410, network interface controller 408, and IP block 404. The instruction conversion logic 536 within each network interface controller is capable of converting memory addresses to network addresses for purposes of transmitting memory-address-based communications through routers of a NOC.

Upon receiving message traffic from routers 410 of the network, each network interface controller 408 inspects each packet for memory instructions. Each packet containing a memory instruction is handed to the memory communications controller 406 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

Returning now to the NOC 402 as depicted in FIG. 5, each IP block 404 is enabled to bypass its memory communications controller 406 and send inter-IP block, network-addressed communications 546 directly to the network through the IP block's network interface controller 408. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through its I/O functions 524 directly to the IP block's network interface controller in command format, then converted to packet format by the network interface controller and transmitted through routers of the NOC to another IP block. Such network-addressed communications 546 are bi-directional, potentially proceeding to and from each IP block of the NOC, depending on their use in any particular application. Each network interface controller, however, is enabled to both send and receive (communication 542) such communications to and from an associated router, and each network interface controller is enabled to both send and receive (communication 546) such communications directly to and from an associated IP block, bypassing an associated memory communications controller 406.

Each network interface controller 408 in the example of FIG. 5 is also enabled to implement virtual channels on the network, characterizing network packets by type. Each network interface controller 408 includes virtual channel implementation logic 538 that classifies each communication instruction by type and records the type of instruction in a field of the network packet format before handing off the instruction in packet form to a router 410 for transmission on the NOC. Examples of communication instruction types include inter-IP block network-address-based messages, request messages, responses to request messages, invalidate messages directed to caches; memory load and store messages; and responses to memory load messages, and so on.

Each router 410 in the example of FIG. 5 includes routing logic 530, virtual channel control logic 532, and virtual channel buffers 534. The routing logic typically is implemented as a network of synchronous and asynchronous logic that implements a data communications protocol stack for data communication in the network formed by the routers 410, links 420, and bus wires among the routers. The routing logic 530 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports 521 connected through bus wires (520-A, 520-B, 520-C, 520-D) to other routers and a fifth port 523 connecting each router to its associated IP block 404 through a network interface controller 408 and a memory communications controller 406.

In describing memory-address-based communications above, each memory address was described as mapped by network interface controllers to a network address, a network location of a memory communications controller. The network location of a memory communication controller 406 is naturally also the network location of that memory communication controller's associated router 410, network interface controller 408, and IP block 404. In inter-IP block, or network-address-based communications, therefore, it is also typical for application-level data processing to view network addresses as the locations of IP blocks within the network formed by the routers, links, and bus wires of the NOC. Note that FIG. 4 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In the NOC 402 depicted in FIG. 5, each router 410 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 410 depicted in FIG. 5 also includes virtual channel control logic 532 and virtual channel buffers 534. The virtual channel control logic 532 examines each received packet for its assigned communications type and places each packet in an outgoing virtual channel buffer for that communications type for transmission through a port to a neighboring router on the NOC.

Each virtual channel buffer 534 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 534 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 408. Each network interface controller is configured to, upon receipt of such a signal, refuse to accept, from its associated memory communications controller 406 or from its associated IP block 404, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 5. When a router encounters a situation in which a packet might be dropped in some unreliable protocol such as, for example, the Internet Protocol, the routers in the example of FIG. 5 suspend by their virtual channel buffers 534 and their virtual channel control logic 532 all transmissions of packets in a virtual channel until buffer space is again available, eliminating any need to drop packets. The NOC 402, as depicted in FIG. 5, therefore, implements highly reliable network communications protocols with an extremely thin layer of hardware.

Note that network interface controller 408 and router 410 depicted in FIG. 5 perform the functions of the packet receiving logic 212 and packet redirection logic 216 described above in FIG. 2. In addition, the breakpoint detection logic 214 interfaces with IP block 404 to cause an incoming software packet to single-step as described above.

Referring now to FIG. 6, additional exemplary detail of core 550, originally presented in FIG. 5, is presented. Core 550 includes an on-chip multi-level cache hierarchy including a unified level two (L2) cache 616 and bifurcated level one (L1) instruction (I) and data (D) caches 618 and 620, respectively. As is well-known to those skilled in the art, caches 616, 618 and 620 provide low latency access to cache lines corresponding to memory locations in system memories (e.g., RAM 306 shown in FIG. 3).

Instructions are fetched for processing from L1 I-cache 618 in response to the effective address (EA) residing in instruction fetch address register (IFAR) 630. During each cycle, a new instruction fetch address may be loaded into IFAR 630 from one of three sources: branch prediction unit (BPU) 636, which provides speculative target path and sequential addresses resulting from the prediction of conditional branch instructions, global completion table (GCT) 638, which provides flush and interrupt addresses, and branch execution unit (BEU) 692, which provides non-speculative addresses resulting from the resolution of predicted conditional branch instructions. Associated with BPU 636 is a branch history table (BHT) 635, in which are recorded the resolutions of conditional branch instructions to aid in the prediction of future branch instructions.

An effective address (EA), such as the instruction fetch address within IFAR 630, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 550, effective-to-real address translation is performed by memory management units (MMUs) and associated address translation facilities. Preferably, a separate MMU is provided for instruction accesses and data accesses. In FIG. 6, a single MMU 611 is illustrated, for purposes of clarity, showing connections only to Instruction Store Unit (ISU) 601. However, it is understood by those skilled in the art that MMU 611 also preferably includes connections (not shown) to load/store units (LSUs) 696 and 698 and other components necessary for managing memory accesses. MMU 611 includes Data Translation Lookaside Buffer (DTLB) 612 and Instruction Translation Lookaside Buffer (ITLB) 613. Each TLB contains recently referenced page table entries, which are accessed to translate EAs to RAs for data (DTLB 612) or instructions (ITLB 613). Recently referenced EA-to-RA translations from ITLB 613 are cached in EOP effective-to-real address table (ERAT) 632.

If hit/miss logic 622 determines, after translation of the EA contained in IFAR 630 by ERAT 632 and lookup of the real address (RA) in I-cache directory 634, that the cache line of instructions corresponding to the EA in IFAR 630 does not reside in L1 I-cache 618, then hit/miss logic 622 provides the RA to L2 cache 616 as a request address via I-cache request bus 624. Such request addresses may also be generated by prefetch logic within L2 cache 616 based upon recent access patterns. In response to a request address, L2 cache 616 outputs a cache line of instructions, which are loaded into prefetch buffer (PB) 628 and L1 I-cache 618 via I-cache reload bus 626, possibly after passing through optional predecode logic 602.

Once the cache line specified by the EA in IFAR 630 resides in L1 cache 618, L1 I-cache 618 outputs the cache line to both branch prediction unit (BPU) 636 and to instruction fetch buffer (IFB) 640. BPU 636 scans the cache line of instructions for branch instructions and predicts the outcome of conditional branch instructions, if any. Following a branch prediction, BPU 636 furnishes a speculative instruction fetch address to IFAR 630, as discussed above, and passes the prediction to branch instruction queue 664 so that the accuracy of the prediction can be determined when the conditional branch instruction is subsequently resolved by branch execution unit 692.

IFB 640 temporarily buffers the cache line of instructions received from L1 I-cache 618 until the cache line of instructions can be translated by instruction translation unit (ITU) 642. In the illustrated embodiment of core 550, ITU 642 translates instructions from user instruction set architecture (UISA) instructions into a possibly different number of internal ISA (IISA) instructions that are directly executable by the execution units of core 550. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 638 to an instruction group, the members of which are permitted to be dispatched and executed out-of-order with respect to one another. Global completion table 638 tracks each instruction group for which execution has yet to be completed by at least one associated EA, which is preferably the EA of the oldest instruction in the instruction group.

Following UISA-to-IISA instruction translation, instructions are dispatched to one of latches 644, 646, 648 and 650, possibly out-of-order, based upon instruction type. That is, branch instructions and other condition register (CR) modifying instructions are dispatched to latch 644, fixed-point and load-store instructions are dispatched to either of latches 646 and 648, and floating-point instructions are dispatched to latch 650. Each instruction requiring a rename register for temporarily storing execution results is then assigned one or more rename registers by the appropriate one of CR mapper 652, link and count (LC) register mapper 654, exception register (XER) mapper 656, general-purpose register (GPR) mapper 658, and floating-point register (FPR) mapper 660.

The dispatched instructions are then temporarily placed in an appropriate one of CR issue queue (CRIQ) 662, branch issue queue (BIQ) 664, fixed-point issue queues (FXIQs) 666 and 668, and floating-point issue queues (FPIQs) 670 and 672. From issue queues 662, 664, 666, 668, 670 and 672, instructions can be issued opportunistically to the execution units of processing unit 603 for execution as long as data dependencies and antidependencies are observed. The instructions, however, are maintained in issue queues 662-

672 until execution of the instructions is complete and the result data, if any, are written back, in case any of the instructions need to be reissued.

As illustrated, the execution units of core 550 include a CR unit (CRU) 690 for executing CR-modifying instructions, a branch execution unit (BEU) 692 for executing branch instructions, two fixed-point units (FXUs) 694 and 605 for executing fixed-point instructions, two load-store units (LSUs) 696 and 698 for executing load and store instructions, and two floating-point units (FPUs) 606 and 604 for executing floating-point instructions. Each of execution units 690-604 is preferably implemented as an execution pipeline having a number of pipeline stages.

During execution within one of execution units 690-604, an instruction receives operands, if any, from one or more architected and/or rename registers within a register file coupled to the execution unit. When executing CR-modifying or CR-dependent instructions, CRU 690 and BEU 692 access the CR register file 680, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 682 contains a count register (CTR), a link register (LR) and rename registers of each, by which BEU 692 may also resolve conditional branches to obtain a path address. General-purpose register files (GPRs) 684 and 686, which are synchronized, duplicate register files and store fixed-point and integer values accessed and produced by FXUs 694 and 605 and LSUs 696 and 698. Floating-point register file (FPR) 688, which like GPRs 684 and 686 may also be implemented as duplicate sets of synchronized registers, contains floating-point values that result from the execution of floating-point instructions by FPUs 606 and 604 and floating-point load instructions by LSUs 696 and 698.

After an execution unit finishes execution of an instruction, the execution notifies GCT 638, which schedules completion of instructions in program order. To complete an instruction executed by one of CRU 690, FXUs 694 and 605 or FPUs 606 and 604, GCT 638 signals the execution unit, which writes back the result data, if any, from the assigned rename register(s) to one or more architected registers within the appropriate register file. The instruction is then removed from the issue queue, and once all instructions within its instruction group have been completed, is removed from GCT 638. Other types of instructions, however, are completed differently.

When BEU 692 resolves a conditional branch instruction and determines the path address of the execution path that should be taken, the path address is compared against the speculative path address predicted by BPU 636. If the path addresses match, no further processing is required. If, however, the calculated path address does not match the predicted path address, BEU 692 supplies the correct path address to IFAR 630. In either event, the branch instruction can then be removed from BIQ 664, and when all other instructions within the same instruction group have completed executing, from GCT 638.

Following execution of a load instruction, the effective address computed by executing the load instruction is translated to a real address by a data ERAT (not illustrated) and then provided to L1 D-cache 620 as a request address. At this point, the load instruction is removed from FXIQ 666 or 668 and placed in load reorder queue (LRQ) 609 until the indicated load is performed. If the request address misses in L1 D-cache 620, the request address is placed in load miss queue (LMQ) 607, from which the requested data is retrieved from L2 cache 616, and failing that, from another core 550 or from system memory (e.g., RAM 528 shown in FIG. 5). LRQ 609 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 610 into which effective addresses for stores are loaded following execution of the store instructions. From STQ 610, data can be stored into either or both of L1 D-cache 620 and L2 cache 616.

Note that core 550 has state, which includes stored data, instructions and hardware states at a particular time, and are herein defined as either being "hard" or "soft." The "hard" state is defined as the information within core 550 that is architecturally required for core 550 to execute a process from its present point in the process. The "soft" state, by contrast, is defined as information within core 550 that would improve efficiency of execution of a process, but is not required to achieve an architecturally correct result. In core 550, the hard state includes the contents of user-level registers, such as CRR 680, LCR 682, GPRs 684 and 686, FPR 688, as well as supervisor level registers 651. The soft state of core 550 includes both "performance-critical" information, such as the contents of L-1 I-cache 618, L-1 D-cache 620, address translation information such as DTLB 612 and ITLB 613, and less critical information, such as BHT 635 and all or part of the content of L2 cache 616. Whenever a software thread (e.g., first software thread 124 and/or second software thread 126) enter or leave core 550, the hard and soft states are respectively populated or restored, either by directly populating the hard/soft states into the stated locations, or by flushing them out entirely using context switching. This state management is preferably performed by the nanokernel (e.g., nanokernels 108a-d described above in FIG. 1).

Figure 7:
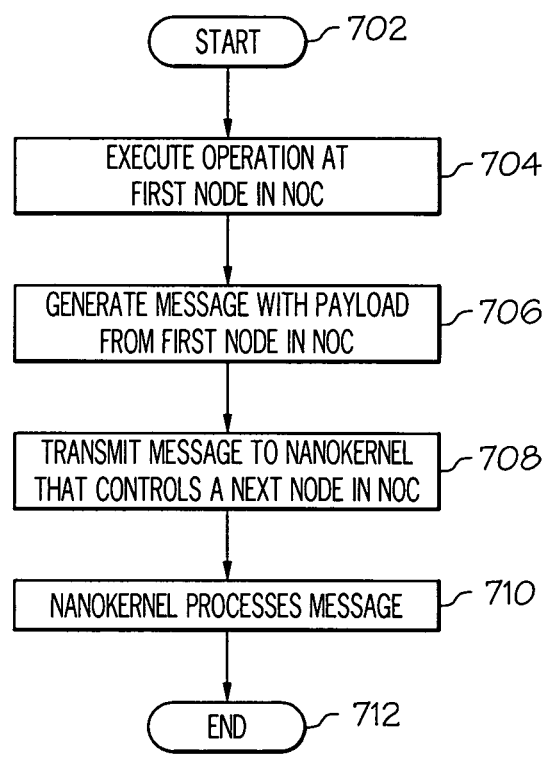
FIG. 7 is a high level flow chart of exemplary steps taken by the present invention to utilize inventive nanokernels to manage processes, including, but not limited to, processes being executed within a NOC.

Referring now to FIG. 7, a high-level flow chart of exemplary steps taken to control an algorithm that is performed on a unit of work in a future software pipeline stage in a NOC is presented. After initiator block 702, an operation (e.g., a first software thread 124 shown in FIG. 1) is executed in logic, such as a first node in a Network On a Chip (NOC), as described in block 704. Execution of this operation results in the generation of a message (block 706), which may include a payload (i.e., output of the execution of the operation) as well as pointers described above in FIG. 1. Such pointers may point to compiled or un-compiled code (e.g., algorithms), data, and/or hardware pipeline stages (nodes in the NOC, hardware threads, cores, etc.) that are to be used in execution of a second operation. Thus, the message is transmitted to a nanokernel that controls a next node in the NOC (e.g., a second hardware pipeline stage), as described in block 708. Note that the first and second node in the NOC may be the same or different nodes, and the nanokernel may be the same or different nanokernels (each of which is associated with a different node in the NOC).

Figure 8:
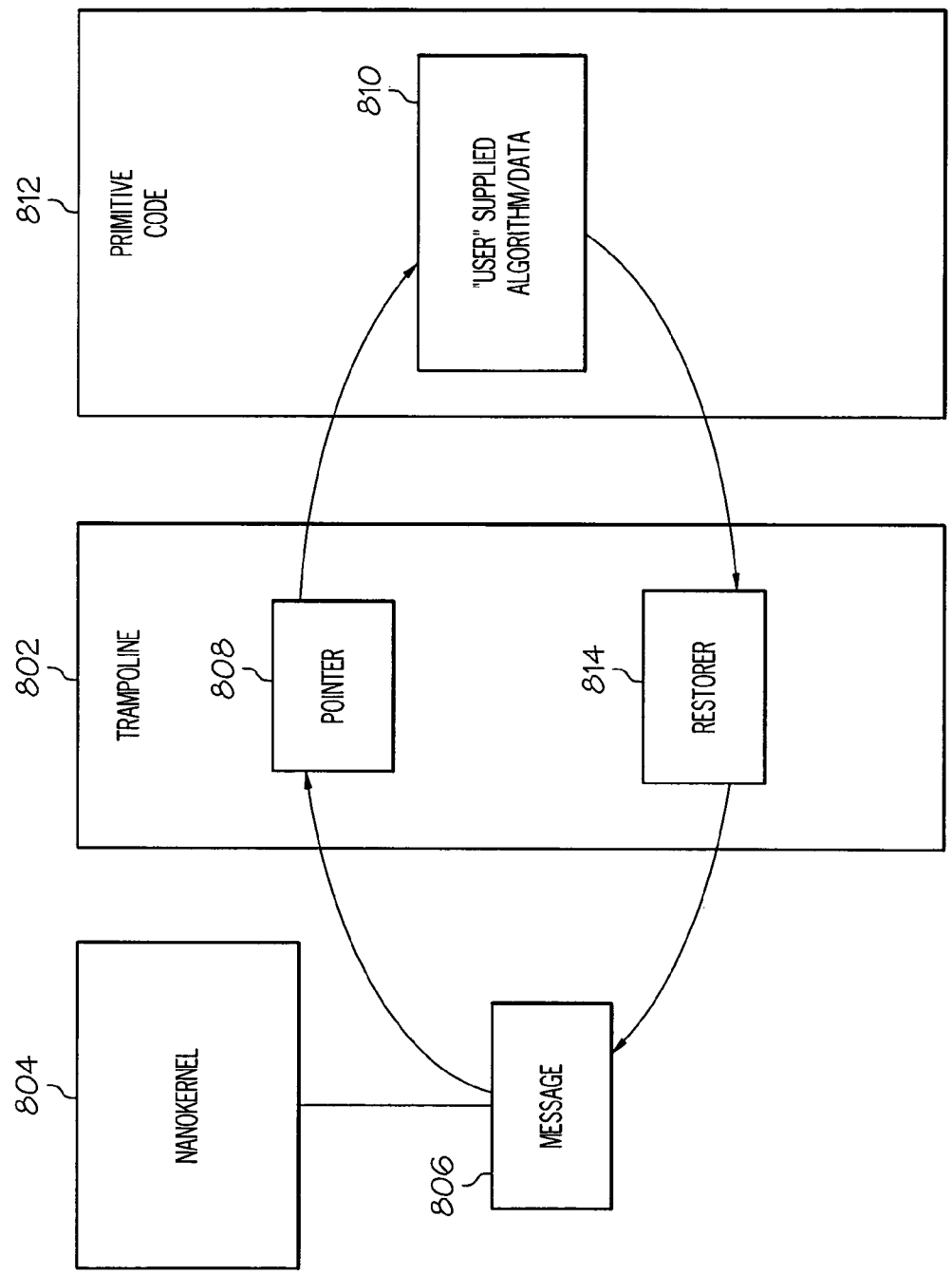
FIG. 8 depicts a "trampoline" that may be used by a nanokernel to call a user supplied algorithm that is part of an exemplary primitive code.

As depicted in block 710, the nanokernel that controls the next node in the NOC then processes the message that has been sent from the first node in the NOC. This step may include multiple sub-steps. First, the nanokernel interprets the message and does any preprocessing, such as directing the message to an appropriate node or other hardware logic, context switching or otherwise preparing registers within the appropriate node with state data needed to handle the message, etc. Next, the nanokernel sets up work data according to the message type by pointing to the appropriate data that will be required (e.g., by the second software thread). In one embodiment, an assembly language trampoline may be used to jump to and execute the user supplied code (e.g., algorithm 120 and/or data 122 shown in FIG. 1). As depicted in FIG. 8, consider now trampoline 802. A nanokernel 804 (e.g., nanokernel 108b shown in FIG. 1) directs a message 806 (e.g., message 110 shown in FIG. 1) to a pointer 808. Note that while pointer 808 may contain the same pointing information as exemplary pointer 118 in message 110 (depicted in FIG. 1 above), pointer 808 is conceptually different from pointer 118 since pointer 808 is not part of message 806, and thus message 806 does not need the bandwidth or processing that is required by message 110 shown in FIG. 1. Furthermore, after pointer 808 aids in the retrieval of the user supplied algorithm and/or data 810 from primitive code 812 (e.g., code used to create a shape on a computer monitor), a restorer 814 in the trampoline 802 is used to restore states in hardware that called the user supplied algorithm/data 810. That is, the restorer 814 sends an instruction back to the message 806 that allows the nanokernel 804 to restore the states of hardware (e.g., a node, core, hardware thread, etc.) that called the user supplied algorithm/data 810.

Returning again to block 710 of FIG. 7, note that the nanokernel may go into a sleep mode (i.e., inactive state but still readily available in local cache) until each new message is received.

Figure 9:
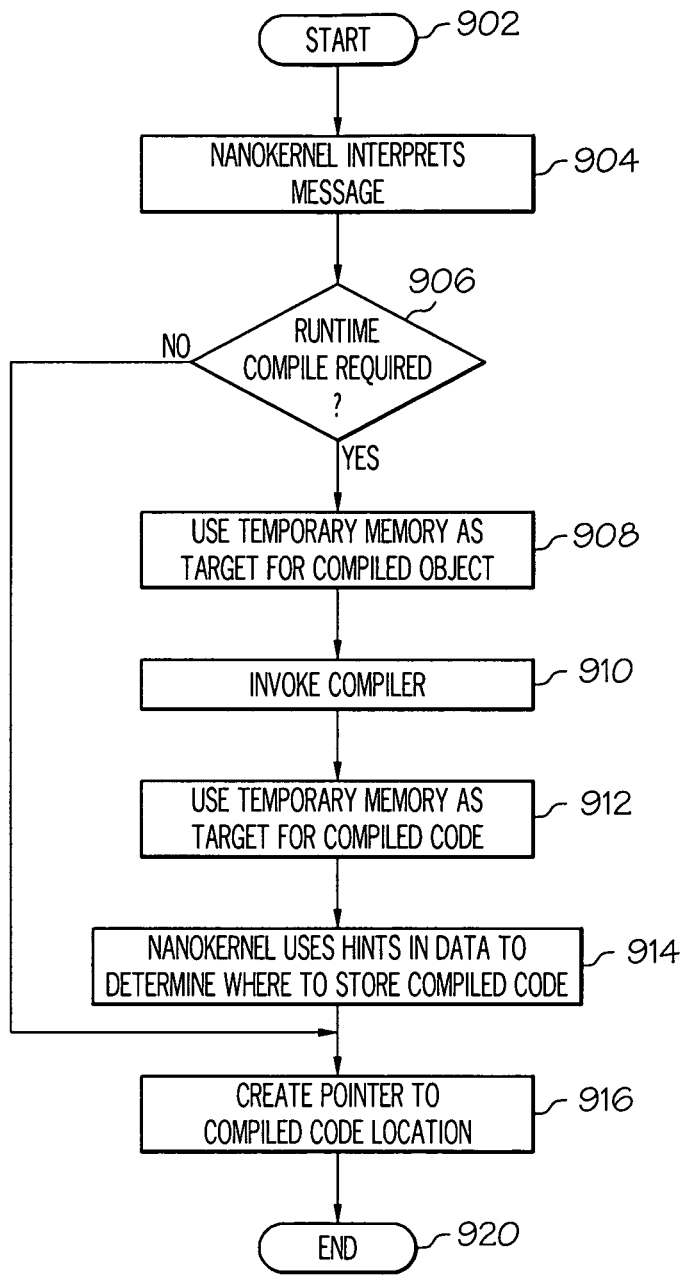
FIG. 9 is a high level flow chart of exemplary steps taken to utilize a nanokernel to compile a called algorithm at run time.

Continuing to further describe other processing embodiments depicted in block 710, consider the flowchart shown in FIG. 9, which describes exemplary steps taken when the message calls an algorithm that has not been pre-compiled, but rather is to be compiled at runtime. After initiator block 902, a nanokernel interprets a message (block 904) to determine if a called algorithm has been pre-compiled. If not, then runtime compiling action is needed (query block 906), and a temporary memory (e.g., a local Instruction Cache) is declared to be the target for the compiled algorithm (block 908). The compiler is then invoked (block 910), and the compiled code is stored in the local temporary memory (block 912). Note that these steps are all under the control of the nanokernel, which uses hints within data (e.g., data 122 described in FIG. 1) to determine where to move the compiled data from the temporary memory of block 908. That is, once the algorithm has been compiled and stored in a local memory, the compiled algorithm is then stored within a particular piece of hardware logic (e.g., a node, core, hardware thread) that will be utilizing the compiled algorithm. This location in which the compiled algorithm code is ultimately stored is controlled by the hint bit in data 122. Once the compiled data is stored at the local processing unit, a pointer is created (block 916), such that a trampoline or other logic described above can locate the compiled algorithm. The process ends at terminator block 920.

Returning now to FIG. 7, once the nanokernel has utilized the compiled algorithm and data in accordance with the message that has been output from a prior logic, the process reiterates until all requisite code within the user application has completed, and the process ends (terminator block 712).

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

What is claimed is:

1. A computer-implemented method of controlling an algorithm that is performed on a unit of work in a subsequent software pipeline stage in a Network On a Chip (NOC), wherein the unit of work comprises an execution of a first operation in a first node in the NOC and an execution of a second operation in a second node in the NOC, the computer-implemented method comprising:
   executing the first operation in the first node of the NOC, wherein the NOC comprises multiple nodes, and wherein a particular operation is executable on any node in the NOC;
   generating a message that includes a payload and a pointer, wherein the message is an output of the first node, wherein the payload is an output of the first operation in the first node, wherein the payload will subsequently be operated upon by the second operation in the second node in the NOC, wherein the pointer points to a location of an algorithm that will be needed by the second operation in the second node, and wherein the algorithm is located by utilizing a trampoline that includes the pointer to the location of the algorithm;
   transmitting the message to a nanokernel that controls the second node in the NOC, wherein said nanokernel is software logic that manages software threads within the NOC by coordinating actions performed by nodes within the NOC, wherein the nanokernel processes the message to extract the payload and to identify the pointer needed to access the algorithm that is needed by the second operation in the second node in the NOC; and
   using the algorithm to execute the second operation in the second node.

2. The computer-implemented method of claim 1, wherein the first node and the second node are different nodes in the NOC.

3. The computer-implemented method of claim 1, wherein the unit of work is performed by a software application, wherein the first operation is a first software thread in the software application, wherein the second operation is a second software thread in the software application, and wherein the second software thread executes subsequently to the first software thread.

4. The computer-implemented method of claim 3, wherein the first node and the second node are a same node in the NOC, and wherein the first operation is performed in a first core in the same node, and wherein the second operation is performed in a second core in the same node.

5. The computer-implemented method of claim 1, wherein the algorithm is precompiled before being identified and accessed by the nanokernel.

6. The computer-implemented method of claim 1, wherein each node in the NOC is associated with a different dedicated nanokernel.

7. The computer-implemented method of claim 1, wherein the nanokernel further:
   restores hard architecture states in a core in the first node after the message is transmitted to the nanokernel that controls the second node in the NOC.

8. The computer-implemented method of claim 1, wherein the algorithm is compiled after being identified and accessed by the nanokernel.

9. A system comprising:
a host computer; and
a Network On a Chip (NOC) coupled to the host computer, wherein the NOC comprises a first node and a second node, wherein the first node executes a first software thread and the second node executes a second software thread, wherein the second software thread executes subsequently to the first software thread by using a payload and a pointer that are generated by and are output from the first software thread, wherein the first node and the second node exchange a message containing the payload and the pointer via at least one nanokernel, wherein said at least one nanokernel is software logic that manages software threads within the NOC by coordinating actions performed by nodes within the NOC, wherein said at least one nanokernel utilizes the pointer in a trampoline to access an algorithm that is needed by the second node after the first node outputs the payload.

10. The system of claim 9, wherein each node in the NOC has a separate dedicated nanokernel.

11. The system of claim 9, wherein each node on the NOC comprises multiple hardware threads, wherein each of the multiple hardware threads comprises a register, an execution unit, and an output buffer that are separate from registers, execution units, and output buffers in other hardware threads in said each node, and wherein each hardware thread is dedicated to executing a specific software thread from said software threads.

12. A computer-readable storage medium on which is encoded a computer program, the computer program comprising computer executable instructions configured for:
executing a first operation from a unit of work in a first node of a Network On a Chip (NOC), wherein the unit of work comprises an execution of the first operation in the first node in the NOC and an execution of a second operation in a second node in the NOC, wherein the NOC comprises multiple nodes, and wherein a particular operation is executable on any node in the NOC;
generating a message that includes a payload and a pointer, wherein the message is an output of the first node, wherein the payload is an output of the first operation in the first node, wherein the payload is subsequently operated upon by the second operation in the second node in the NOC, wherein the pointer points to a location of an algorithm that will be needed by the second operation in the second node, and wherein the algorithm is located by utilizing a trampoline that includes the pointer to the location of the algorithm;
transmitting the message to a nanokernel that controls the second node in the NOC, wherein said nanokernel is software logic that manages software threads within the NOC by coordinating actions performed by nodes within the NOC, wherein the nanokernel processes the message to extract the payload and to identify the pointer needed to access the algorithm that is needed by the second operation in the second node in the NOC; and
using the algorithm to execute the second operation in the second node.

13. The computer-readable storage medium of claim 12, wherein the algorithm is located by the nanokernel utilizing a trampoline that includes a pointer to the algorithm.

14. The computer-readable storage medium of claim 12, wherein the first node and the second node are different nodes in the NOC.

15. The computer-readable storage medium of claim 12, wherein the first node and the second node are a same node in the NOC.

16. The computer-readable storage medium of claim 12, wherein each node in the NOC is associated with a different dedicated nanokernel.

17. The computer-readable storage medium of claim 12, wherein the nanokernel further:
restores hard architecture states in a core in the first node after the message is transmitted to the nanokernel that controls the second node in the NOC.

* * * * *